(12) United States Patent
Rudofsky

(10) Patent No.: US 11,787,508 B2
(45) Date of Patent: Oct. 17, 2023

(54) POWERED BOOTS

(71) Applicant: Keith Maximilian Rudofsky, Fort Lauderdale, FL (US)

(72) Inventor: Keith Maximilian Rudofsky, Fort Lauderdale, FL (US)

( * ) Notice: Subject to any disclaimer, the term of this patent is extended or adjusted under 35 U.S.C. 154(b) by 0 days.

(21) Appl. No.: 17/238,202

(22) Filed: Apr. 23, 2021

(65) Prior Publication Data

US 2021/0331768 A1    Oct. 28, 2021

Related U.S. Application Data

(60) Provisional application No. 63/014,548, filed on Apr. 23, 2020.

(51) Int. Cl.
| | | |
|---|---|---|
| *B62M 27/02* | (2006.01) | |
| *B62D 55/104* | (2006.01) | |
| *B62D 55/10* | (2006.01) | |
| *A63C 17/10* | (2006.01) | |
| *A63C 17/12* | (2006.01) | |

(52) U.S. Cl.
CPC ............ *B62M 27/02* (2013.01); *B62D 55/10* (2013.01); *B62D 55/104* (2013.01); *A63C 17/10* (2013.01); *A63C 17/12* (2013.01); *B62M 2027/023* (2013.01); *B62M 2027/025* (2013.01); *B62M 2027/026* (2013.01)

(58) Field of Classification Search
CPC ............ B62M 27/02; B62M 2027/023; B62M 2027/026; B62D 55/10; B62D 51/007; B62D 51/02; A65C 5/08; A65C 5/085; A63C 5/08; A63C 5/085; A63C 2203/46; A63C 2203/40; A63C 2203/12; A63C 5/16; A63C 17/10; A63C 17/265; A63C 17/12; A63C 17/18; A63C 17/0093
USPC .................................. 180/180, 181, 9, 9.26
See application file for complete search history.

(56) References Cited

U.S. PATENT DOCUMENTS

| | | | | |
|---|---|---|---|---|
| 3,684,305 | A * | 8/1972 | McDonald | A63C 17/045 |
| | | | | 280/11.19 |
| 5,048,632 | A * | 9/1991 | Battel | A63C 17/12 |
| | | | | 180/9.1 |
| 5,305,846 | A * | 4/1994 | Martin | A63C 17/12 |
| | | | | 280/14.28 |
| 5,643,029 | A | 7/1997 | Rudofsky | |
| 5,730,241 | A * | 3/1998 | Shyr | A63C 17/10 |
| | | | | 180/181 |
| D476,599 | S * | 7/2003 | Whittington | D12/7 |
| 7,575,075 | B2 * | 8/2009 | Fairhead | B62D 11/12 |
| | | | | 180/6.7 |
| 8,672,074 | B2 * | 3/2014 | Ganeous | A43B 5/1641 |
| | | | | 280/11.115 |
| 9,889,368 | B1 * | 2/2018 | Chen | A63C 17/045 |
| 9,925,453 | B1 * | 3/2018 | Tuli | A43C 19/00 |

(Continued)

*Primary Examiner* — Anne Marie M Boehler

(57) ABSTRACT

Electric Powered Boots are a new compact and rugged motorized multi-terrain micro-vehicle for individual power-sports, mobility for ground troops, or anyone who has difficulty in walking or running. For use on snow, sand, asphalt, hard dirt, or mud, electric powered boots elevate the prior teachings of motorized surf boots of U.S. Pat. No. 5,643,029 to the next level of fit, form, and function, by adding novel features and components in an innovative packaging arrangement that provides increased safety, functionality, and ergonomics during use on land.

6 Claims, 3 Drawing Sheets

(56) References Cited

U.S. PATENT DOCUMENTS

| | | | |
|---|---|---|---|
| 10,807,659 B2* | 10/2020 | Pikulski | B62D 51/001 |
| 2002/0074176 A1* | 6/2002 | Justus | A63C 11/10 |
| | | | 180/181 |
| 2009/0101427 A1* | 4/2009 | Baldwin | B62D 55/104 |
| | | | 180/181 |
| 2019/0256163 A1* | 8/2019 | Chen | B62K 11/007 |
| 2020/0189672 A1* | 6/2020 | Gnedov | B62D 55/14 |
| 2021/0276670 A1* | 9/2021 | Rudofsky | B63B 32/70 |
| 2022/0063770 A1* | 3/2022 | Rudofsky | B63H 25/02 |

* cited by examiner

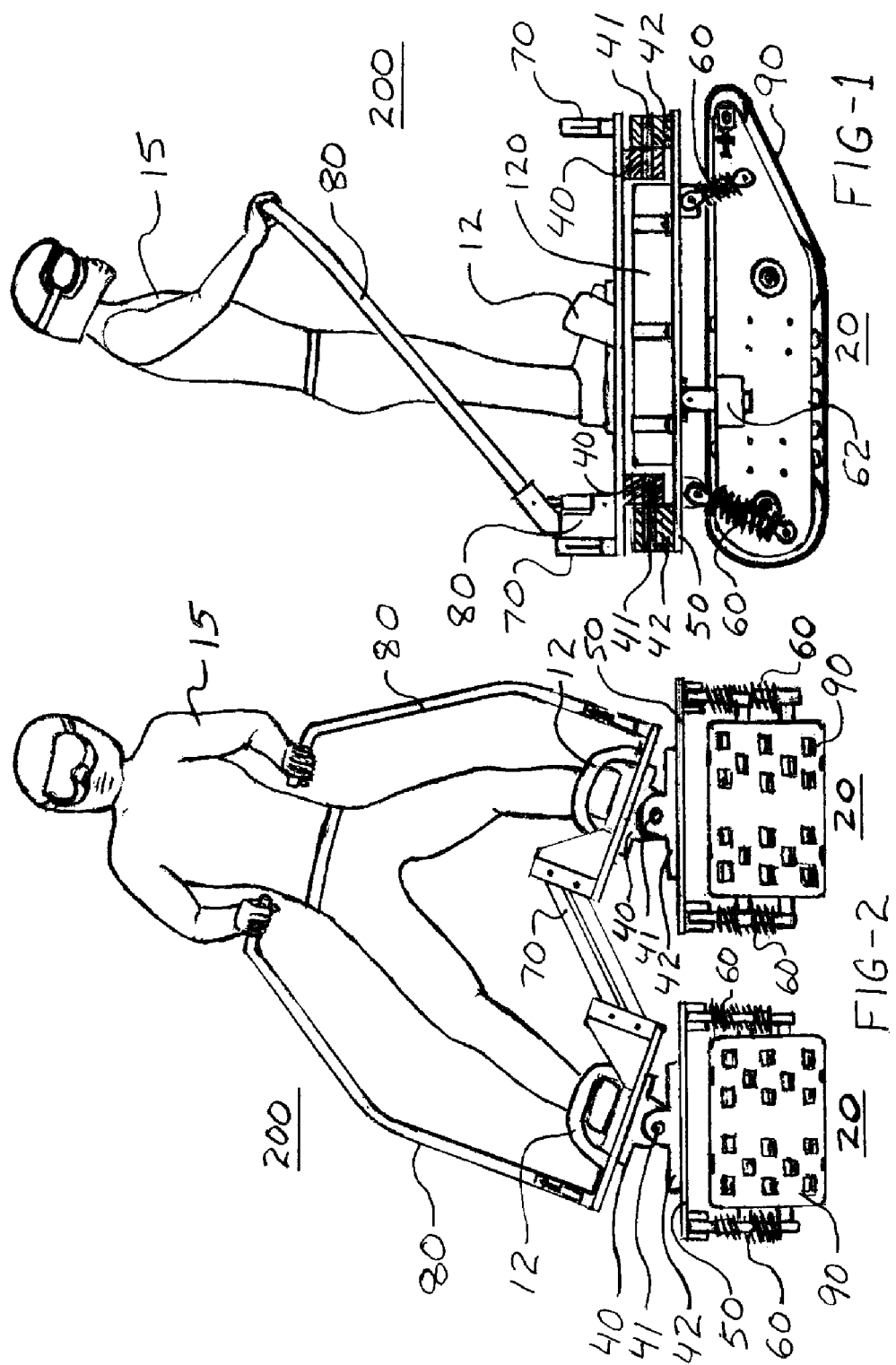

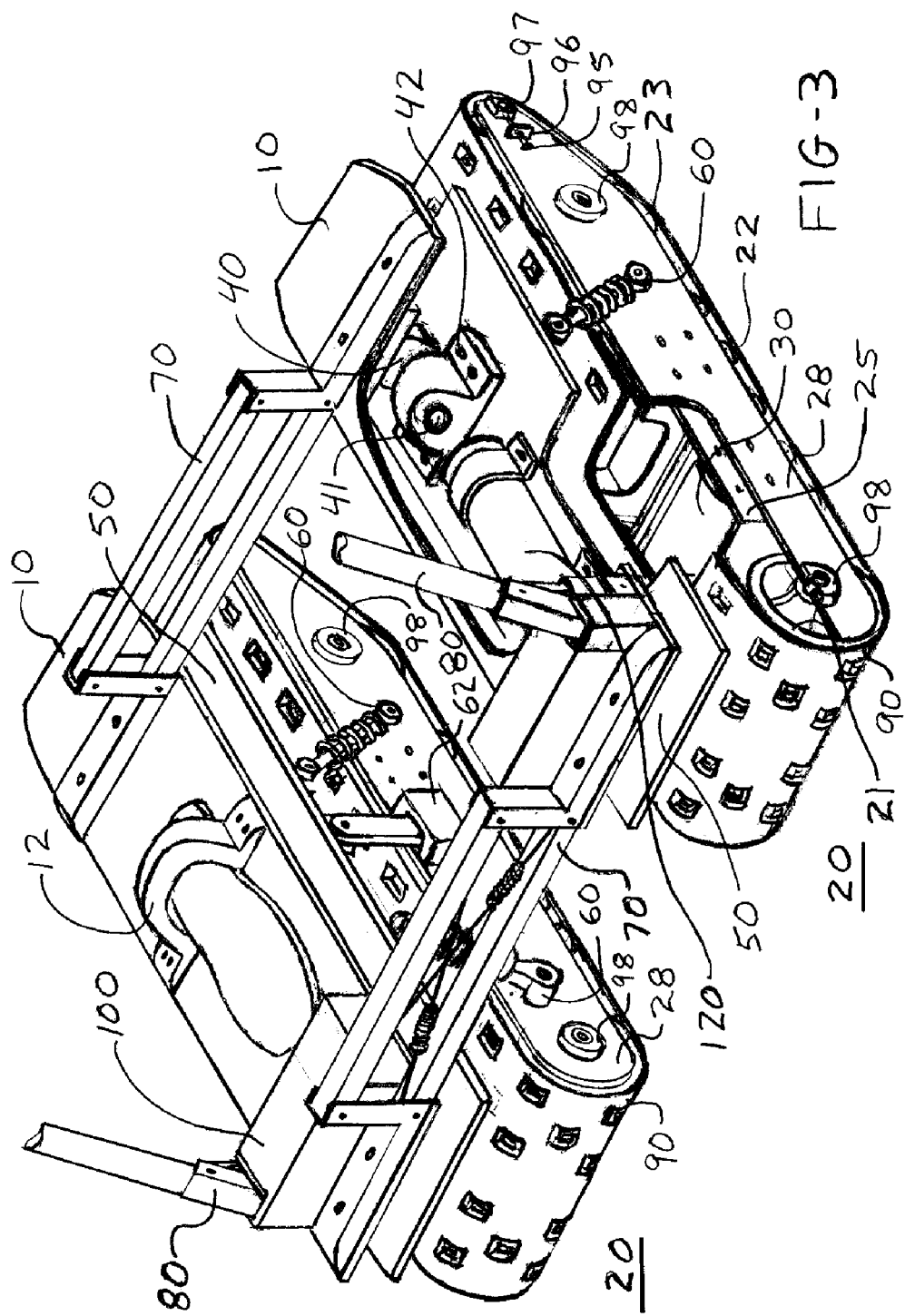

POWERED BOOTS

FIELD OF THE INVENTION

This invention relates to motorized micro-mobility vehicles for individual use including powersports activities and mobility for ground troops, as well as for persons with walking or running disabilities. Micro-mobility refers to a range of small, lightweight vehicles operating at speeds typically below 25 km/h (15 mph) and driven by users personally.

The market demand for micro-mobility is poised for significant growth in the next 5-7 years.

BACKGROUND OF THE INVENTION

On Jul. 1, 1997 the first Rudofsky patent grated, U.S. Pat. No. 5,643,029 Motorized Surf Boots offered a new motorized sports activity for individuals, by incorporating a pair of boots on a pair of boards, and powering the combination by a pair of motors, controlled respectively by a pair of handheld throttles.

The embodiment illustrated in the U.S. Pat. No. 5,643,029 Motorized Surf Boots patent was shown and described for use in water, while only referencing the idea of being able to use the invention on land by adding wheels to the underside of each of the boards, column 2, lines 5-10, and column 5, lines 30-40. However, the means of attaching wheels to the underside of the boards was not defined, nor was the fit, form, or controlled and safe function of the wheeled embodiment reduced to an art.

Additionally, the connecting links described on the original 5,643,029 Motorized Surf Boots patent, in Column 4, lines, 30-55, describes two rigid links, a forward, and a rearward, which keep the boards at a fixed distance relative to each other, also referenced as claim 9, column 6, lines 33-36. The connection between the link and the board is described as a pivotable connection, namely a typical ball and socket. However, there is an inherent inadequacy in this connection arrangement, in that there exist too many degrees of freedom between the boards. During operation of the Motorized Surf boots in the water embodiment with said rigid links connecting the said boards, it was found that if the boards were top heavy, each board would randomly twist longitudinally independent of the other board, resulting in difficulty for the rider to keep balanced and be able to steer effectively while on the pair of boards.

Another deficiency in the original U.S. Pat. No. 5,643,029 Motorized Surf Boot patent is the arrangement of supports for the handheld throttles. The patent describes in column 4, lines 44-51 that the "handheld throttles can be held in place as part of a frame network supported by pivot couplings that are positioned on the boards forwardly of the boots". In operation this utility is not effective in enabling the rider to kneel or squat while relying on the frame network for bodily support or to impart body English into the boards to aid in steering.

Also, the drawings for the Surf Boots shown in U.S. Pat. No. 5,643,029 was illustrated only with regard to water use and included propellers that were driven by a pair of gasoline engines, whereby the pair of engines were mounted on the respective top rearward sides of the pair of boards. While this propulsion arrangement was valid for the gasoline engines, alternate types of propulsion systems, were not elaborated on, nor was the means for fitting or arranging alternate propulsion schemes reduced to an art.

However, the recent Rudofsky patent application U.S. patent Ser. No. 17/220,934 dated 4 Apr. 2021 claims the use of a pair of electric marine thrusters to respectively propel the pair of boards (or hulls), with the pair of electric marine thrusters powered respectively by a pair of battery packs and controlled by a pair of electronic modules activated by the handheld throttles. While this novel means of electric propulsion is an instrumental upgrade for the water embodiment of Surf Boots, it does not provide a suitable arrangement for electric powered Surf Boots for use on land, and with the use of wheels.

As electric powered propulsion devices, batteries and electronics become smaller, lighter in weight, and more power dense, it's becoming possible to package these components tightly and compactly within an envelope of essentially the size of a pair of boots. It should be easy to envision then that the most basic and ergonomic form of a micro-mobility vehicle for land use will ideally be a design that is similar in fashion to the size and shape of a pair of boots (or shoes), one being fitted on each foot. In operation of this most basic and easy to use micro-mobility device, the individual should be able to safely stand erect on the device while at a standstill (not moving), and once choosing to move forwardly, does so while facing forward. Also, as would be normal to remain comfortable and in balance in a forward-facing stance, the device would need to conform to the individual's natural tendency to want to lean into turns (as one does when snow skiing down a hill on a pair of skis).

BRIEF SUMMARY OF THE INVENTION

It is an object of the present invention to define the art a wheeled embodiment of a pair of Motorized Surf Boots that can be used on various land terrains including, snow, sand, asphalt, hard dirt, or mud. The pair of wheeled configurations in the present invention range from individually powered wheels that come in direct contact with asphalt or hard dirt to a full-track system (rubber drive belt system similar to a snowmobile).

It is an object of the current invention to incorporate the Connecting Chassis referred to in Rudofsky U.S. patent Ser. No. 17/237,960 dated 22 Apr. 2021 as part of the overall assembly arrangement of Motorized Surf Boots for land use, whereby each board (or boot), is not only fixed at a distance with respect to each other, but also remains parallel to each other, and in operation one board (or boot) does not lag behind the other. The pair of Motorized Surf Boots fitted with the connecting chassis will provide the rider the ability to lean into turns (or carve into turns) with an adjustable spring assisted re-centering functionality so as to aid the rider to exit a turn and continue on a straight path.

It is an object of the current invention to incorporate the Handlebars for use on Motorized Surf Boots invention of U.S. patent Ser. No. 17/238,144 dated 22 Apr. 2021 as part of the overall assembly arrangement of Motorized Surf Boots for land use, whereby the pair of board (or boots), are fitted with a pair of handlebars to mount handheld throttles. Each handlebar of the pair will be seen to be fastened to its respective board behind the boots (or foot supports), and firmly secured to its board to allow the rider to impart body English into both boards simultaneously in order to assist in leaning or "carving" into turns. In this arrangement the handlebars will also be seen to articulate up and down with damping control, allowing the rider to squat, stand, or bend over on the boards while still being able to continue gripping the handheld throttles comfortably and ergonomically.

It is yet another object of the present invention to improve upon the original Motorized Surf Boots propulsion arrangement by providing a pair of electrically motorized Surf Boots, wherein the construction of each boot (or board) includes the art of packaging one or multiple electric motors to drive the wheels or rollers of said Surf Boots. Said electric motors can be packaged as hub type motors (inserted within each wheel) or packaged tandem within a track assembly so driving the wheels with a typical pulley and drive-belt method.

It will become clear from the following description, that the apparatus of the present invention takes the prior teachings U.S. Pat. No. 5,643,029 Motorized Surf Boots to the next level of fit, form, and function for land use, by transforming the configuration into a compact and rugged, yet safe and easy to use, multi-terrain micro-mobility vehicle. In a preferred embodiment for rider comfort, each board (or boot) of the pair will be seen to be mounted to a carriage assembly that is suspended via suspension system mounted to its track assembly which houses the wheeled or track options, electric motors, batteries and electronics.

BRIEF DESCRIPTION OF THE SEVERAL VIEWS OF THE DRAWINGS

These and other features of the present invention will be more clearly understood from a consideration of the following description, taken in connection with the accompanying drawings, in which:

FIG. 1 is a side view of a pair of Powered Boots with rider on board.

FIG. 2 is a front view of a pair of Powered Boots with rider on board.

FIG. 3 is a rear perspective view of a pair of Powered Boots without a rider on board, showing a partial cut away view through the right-side Powered Boot.

DETAILED DESCRIPTION OF THE DRAWINGS

Figure 4:
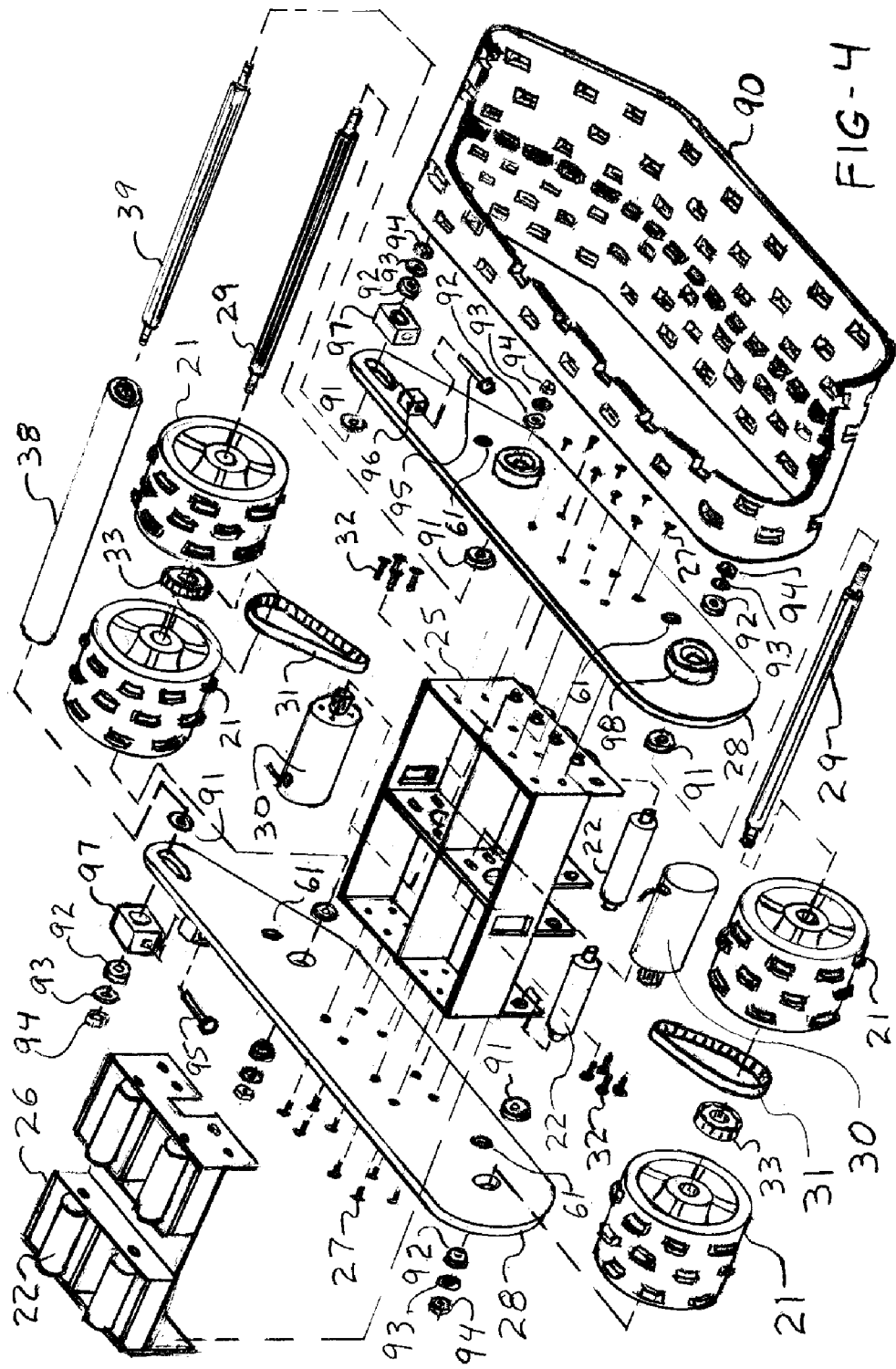
FIG. 4 is an expanded rear isometric view of one of the track assemblies.

In an embodiment of the invention that may be used in snow or sand, as shown in FIGS. 1-4 as reference numeral 200, and their sub-parts, the pair of boards employed are illustrated by the reference numeral 10, as being of predetermined length, width, thickness, and overall shape in accordance with the size and weight of the rider 15. The boards 10 are constructed of any suitable materials or combinations thereof.

The pair of boards 10 provide individual platforms, one for each leg of the rider 15 to stand on. On the tops of the boards 10 there other strategically placed components to aid the rider in controlling the pair of boards, including the boots, or foot braces 12, the Chassis to Connect Motorized Surf Boots of U.S. patent Ser. No. 17/237,960, referenced by numeral 70, and also the Retractable Handlebars for use on Motorized Surf Boots of U.S. patent Ser. No. 17/238,144 referenced by numeral 80. Also positioned on the top sides of each of the pair of boards are electronics compartments 100, in which are house electronics which operate electric motors 30 described later herein.

On the bottom side of the boards 10, are attached longitudinally placed bearing assemblies 40, which ride on a shaft 41, that is mounted to a shaft mounting block 42. The purpose of components 40-43 or other suitable components is for; while standing on the pair of boards, the rider will have the ability to impart a roll angle to the boards, by combining foot action within the foot braces 12 and leveraging the handlebars 80, rotate the boards off the horizontal to either side as desired. Additionally, by use of the chassis 70, the boards will remain at a fixed distance to each other and parallel, and share the same angle of rotation, so that when the powered boots 200 are being ridden, the rider will be able to lean or "carve" into turns.

The pair of longitudinal bearing components 40-42 and/or other suitable components in which to facilitate a roll angle imparted to the pair of boards is each also connected respectively to each of a pair of carriages 50. The pair of carriages 50 rides smoothly over the pair of track assemblies 20 by use of multiple shock absorbers 60, which are connected from the sides of the carriages 50, downwards to the side panels 28. Additionally, extending down on each side from the carriage 50 to the side panels 28 are linear motion bearings 62 to prevent forward or rearward shifting of the carriage 50 with respect to the track assembly 20 as the shock absorbers perform their function. Mounted to the top side of each carriage 50 are batteries 120 which primarily provide the energy to power the electric motors 30. The batteries 120 may also provide power to various other optional features that can be easily fitted onto the Powered Boots including lights, horns, music, mobile phones, among others. The pair of carriages 50 are constructed of any suitable materials or combination thereof.

The track assemblies 20 may consist of various configurations as is well known to those skilled in the art of assembling track systems. The track assemblies shown in FIGS. 1-4 are of the full track type. FIG. 4 shows an expanded view of one possible configuration for the track assembly where there is a bottom frame 25, where electric motors 30 are housed and attached by screws 32 or other suitable means. The electric motors 30 drive a belt 31, which turns a drive gear 33. Said drive gear 33 has internal splines in its bore, which mates with the drive shaft 29 which also has splines along its length. Also, with splines in their bore are drive wheels 21 which are positioned along the drive shaft 29, on either side of the drive gear 33. Once assembled through the drive wheels 21, drive gear 33, and thrust bearings 91, the drive shaft 29 is inserted through holes in each of the side panels 28, where, on the outside includes a welded-on bush 98, to add roller bearing 92, washer 93, and axle nut 94. Additionally shaft 39 can be inserted through a nose roller 38 and in like manner pass through thrust bearings 91 and side panels 28, and held in place by roller bearings 92, washer 93, and nut 94. In this case however, a loose bush 97 is employed, which when used in conjunction with a threaded block 96 which is welded to the side panels 28, and the tension adjustment bolt 95, which once threaded through block 96, will contact bush 97, thus will provide a tensioning mechanism after the continuous track 90 is fitted. Next, the top frame 26 can be assembled and attached to both the lower frame 25 and side panels 28 with the upper screws 27 or other suitable attachment scheme. Rollers 22 can be added to both the lower frame 25 and the upper frame 26. The rollers 22 will perform as additional guides for the track 90, especially towards the bottom, where the track 90 interfaces with the terrain. The number of rollers 22 employed, may vary, according to the many various sizes of powered boots that can manufactured according the teaching described herein. The final component to complete the track assembly 20 is to add the continuous track 90, which is typically made from a rugged rubber or woven material that is fitted around all the wheels 21 and rollers 22. The continuous track 90 will be seen to include a pattern of holes or other suitable features, that when the track is properly tensioned with the tensioning bolts 95, mate with the protrusions on the drive wheels 21, in order to keep the track 90 rotating at the same rate as the drive wheels 21 and prevent the track 90 from slipping. Additionally, there will be seen longitudinally along the center of the inside surface of the track 90, teeth that protrude inward, so that when the track 90 is installed and properly tensioned, prevents the track from shifting from side to side.

While the above discusses an assembly arrangement for a full continuous track, it should be readily appreciated that a half-track could be described just the same, whereby a set of skis may occupy the forward portion of the apparatus of the powered boots 200. Additionally, it should be also appreciated that the track assemblies 20 described herein may be configured to not include the continuous track 90, but only ride on the large drive wheels 21, where the drive wheels 21 may include a typical tire tread for use on asphalt or hard dirt.

In the many track 20 configurations possible, without deviating from the scope of the teaching herein, an alternative position for the electric motors 30 may be employed by nestling them inside of the drive wheels 21 as is possible with commonly known electric hub motors.

While there have been described what are considered to be a preferred configuration of the present invention, it will be readily appreciated by those skilled in the art that modifications can be made without departing from the scope of the teachings herein. For at least such reason, therefore, resort should be had to the claims appended hereto for a true understanding of the scope of the invention.

I claim:

1. Motorized surf boots for land use comprising:
   a pair of boards of predetermined length, width, and cross-section, each board, of said pair of boards, acting as a platform for each of a pair of boots or a pair of foot braces;
   a pair of carriages;
   a pair of track assemblies, each track assembly containing a track or wheels directly in contact with a ground surface;
   a pair of longitudinal bearing components, for rotating said pair of boards in order to "carve" into turns, one said bearing component attached to the underside of each said board and to a respective said carriage;
   multiple shock absorbers connecting each said carriage and a respective said track assembly;
   one or more electric motors mounted within each said track assembly;
   one or more batteries mounted on the topside of each of said carriages;
   electronics contained in electronics compartments on the topside of each of said boards;
   a pair of retractable handlebars operably connected to said pair of boards; and
   a chassis having structures connected between front portions of the respective boards and between rear portions of the respective boards.

2. The motorized surf boots of claim 1 further comprising two or more linear bearings connecting each said carriage and each said track assembly.

3. The motorized surf boots of claim 2, wherein the two or more linear bearings are attached to side points of each carriage and on sides of said track assembly.

4. The motorized surf boots of claim 1, further comprising a drive gear secured to a splined shaft between two drive wheels of each said track assembly.

5. The motorized surf boots of claim 1, further comprising a set of guide rollers mounted to an internal frame of each of said track assemblies.

6. The motorized surf boots of claim 1, further comprising a tensioning mechanism attached to sides of each said track assembly.

* * * * *